United States Patent [19]

Kelleher et al.

[11] Patent Number: 4,935,880

[45] Date of Patent: Jun. 19, 1990

[54] METHOD OF TILING A FIGURE IN GRAPHICS RENDERING SYSTEM

[75] Inventors: Brian Kelleher, Mountain View; Thomas C. Furlong, Half Moon Bay, both of Calif.

[73] Assignee: Digital Equipment Corporation, Maynard, Mass.

[21] Appl. No.: 137,752

[22] Filed: Dec. 24, 1987

[51] Int. Cl.[5] .............................................. G06F 15/20

[52] U.S. Cl. .................................... 364/522; 340/750; 340/799; 364/521

[58] Field of Search ....................... 364/518, 521, 522; 340/721, 750, 798-800; 382/44-48

[56] References Cited

U.S. PATENT DOCUMENTS 4,590,465 5/1986 Fuchs ................................ 340/723

FOREIGN PATENT DOCUMENTS 0201754 11/1986 European Pat. Off. .

0231780 8/1987 European Pat. Off. .

8500679 2/1985 World Int. Prop. O. .

*Primary Examiner*—Gary V. Harkcom

*Assistant Examiner*—H. R. Herndon

*Attorney, Agent, or Firm*—Flehr, Hohbach, Test, Albritton & Herbert

[57] ABSTRACT

A method for drawing a convex geometric figure to framebuffer storage uses a plurality of update arrays which tile the framebuffer, each having a determined origin with respect to the framebuffer. Each update array has a multiplicity of concurrently updatable pixel storage sites, each specified by an offset from array origin. A figure is specified by a set of directed segments which form its perimeter. To access only those update arrays which tile the figure, the following methodology is used. A first update array which is known to be part of the figure is accessed. Tests are then performed to find whether the figure extends to arrays above or below the accessed array. If so, the array address is stored and marked for either or both extensions. In one embodiment, a test is performed for left extension, and the steps are repeated until no further left extension is found. Returning to the initial array, the steps are repeated for right extension to complete the horizontal subset. The array marked for either up or down extension of the figure is next accessed and the steps are repeated with respect to the indicated vertically adjacent array until no further extension is found in that vertical direction; the steps are then repeated for the other vertical direction. Using this method, the figure is efficiently tiled without duplicating access to any update arrays and without accessing any update arrays that do not tile the figure.

9 Claims, 7 Drawing Sheets

METHOD OF TILING A FIGURE IN GRAPHICS RENDERING SYSTEM

This invention relates to single-instruction multiple-data (SIMD) graphics systems, and in particular to a method and means of performing graphics rendering operations in such a system.

BACKGROUND OF THE INVENTION

In a data processing system with graphics capability, a system processor executing a graphics application program outputs signals representing matter to be displayed; this representation is generally abstract and concise in form. Such form is not suitable for the direct control of a display monitor; it is necessary to transform the relatively abstract representation into a representation which can be used to control the display. Such transformation is referred to as graphics rendering; in a system using a raster display monitor, the information comprising the transformed representation is referred to as a framebuffer. Signals specifying the framebuffer information are stored in framebuffer storage.

The framebuffer representation must be frequently updated, by rewriting its stored specification in part or completely, either to reflect dynamic aspects of the display, or to provide for the display of images generated from a different application program. Each updating operation requires access to the memory in which the specification of the framebuffer is stored; generally a large number of locations in the framebuffer storage must be accessed for each updating operation. The speed of rendering the display is limited by the requirement for graphics memory access; the greater the number of bits in the graphics memory (framebuffer storage) that can be read or written in a given time period (the "memory bandwidth"), the better the graphics performance.

Graphics memory bandwidth depends on the number of memory packages (chips) comprising the graphics memory, multiplied by the number of i/o pins per package; the product is the maximum possible number of bits that can be accessed in one memory transaction. Bandwith is then a function of this maximum number and of the time required for a memory transaction.

Many conventional graphics rendering operations are carried out by a series of steps that are highly incremental in nature; that is, the value of a particular framebuffer pixel cannot be updated (and the framebuffer storage rewritten) until the updated value of an adjacent framebuffer pixel is known. Framebuffer updating carried out by means of such incremental operations requires frequent memory transactions, each involving a relatively small number of bits. The rendering performance of such a graphics system can be improved by decreasing the time required for a memory transaction, but will not be much improved by increasing the number of bits which can be addressed in a transaction. If increased memory bandwidth is to improve the graphics performance, means must be provided for making efficient use of the bandwidth during graphics rendering operations.

It is an object of the present invention to provide, for framebuffer storage that is accessed as framebuffer pixel arrays, a graphics rendering operation that makes efficient use of the increased bandwidth provided by such framebuffer memory architecture. In particular, it is an object to provide means and method for selecting from an addressed pixel array those pixels to which is mapped a geometric figure to be drawn to the framebuffer.

BRIEF DESCRIPTION OF THE INVENTION

The present invention is employed in a graphics subsystem having framebuffer storage organized for storing signals specifying the pixels (x,y) of a X×Y raster framebuffer. The storage is sequentially addressable as a plurality of framebuffer pixel update arrays, the set of update arrays tiling the framebuffer.

Each update array has a determined origin with respect to the framebuffer and comprises storage sites for specifications of a plurality of contiguously positioned framebuffer pixels. Each storage site is specifiable by an offset with respect to the update array origin, the pixel specifications of an update array being concurrently updatable in a parallel memory transaction.

According to the invention, a method is provided for accessing from among the update arrays a horizontal subset to which is mapped a geometric figure to be drawn to the framebuffer. The method comprises the steps:

1. accessing a first update array, and storing a specification of the array address marked as initial, 2. testing whether the geometric figure is mapped to the update array positioned vertically above the accessed array with respect to the framebuffer, and if so, and if no previous array in the present horizontal row has been marked for up, storing a specification of the array address if not previously stored, and marking the stored array address specification for up, 3. testing whether the geometric figure is mapped to the update array positioned vertically below the accessed array with respect to the framebuffer, and if so, and if no previous array in the present horizontal row has been marked for down, storing a specification of the array address if not previously stored, and marking the stored array address specification for down, 4. testing whether the geometric figure is mapped to the update array positioned horizontally next to the left of the accessed array with respect to the framebuffer, and if so, accessing the next left array, 5. repeating steps 2–4 with respect to the array accessed in step 4 until the geometric figure is found not to be mapped to the next left array, 6. popping to the stored array address marked as initial, testing whether the geometric figure is mapped to the update array positioned horizontally next to the right of the accessed array with respect to the framebuffer, and if so, accessing the next right array, 7. repeating steps 2–4 with respect to the array accessed in step 6 until the geometric figure is found not to be mapped to the next right array.

The entire geometric figure to be drawn is tiled by performing the above steps until in a first horizontal subset of arrays, all arrays to which the geometric figure is mapped have been accessed; popping to the stored array address marked for up, accessing the update array vertically above the specified array, storing a specification of the address of the array marked as initial, and repeating steps 2–7 above with respect to the currently accessed array until a next horizontal subset of arrays to which the geometric figure is mapped has been accessed; repeating the previous step for further horizontal subsets until no further stored addresses marked for up are found; popping to the stored array address marked for down of the first horizontal subset, accessing the update array vertically below the specified array, storing a specification of the address of the array marked as initial, and repeating steps 2-7 above with respect to the currently accessed array until a next horizontal subset of arrays to which the geometric figure is mapped has been accessed; repeating the previous step for further horizontal subsets until no further addresses marked for down are found.

The initial array may be the array to which a first vertex of the geometric figure is mapped, or the array to which the left-most point of the figure is mapped. A further constraint, that the array must be mapped to a bounding box which contains the figure, is imposed to prevent drawing the figure to arrays beyond such box.

A method of deciding whether a geometric figure is mapped to a next adjacent update array is provided.

Other objects, features and advantages will appear from the following description of a preferred embodiment, together with the drawing, in which:

DETAILED DESCRIPTION OF THE INVENTION

Figure 1:
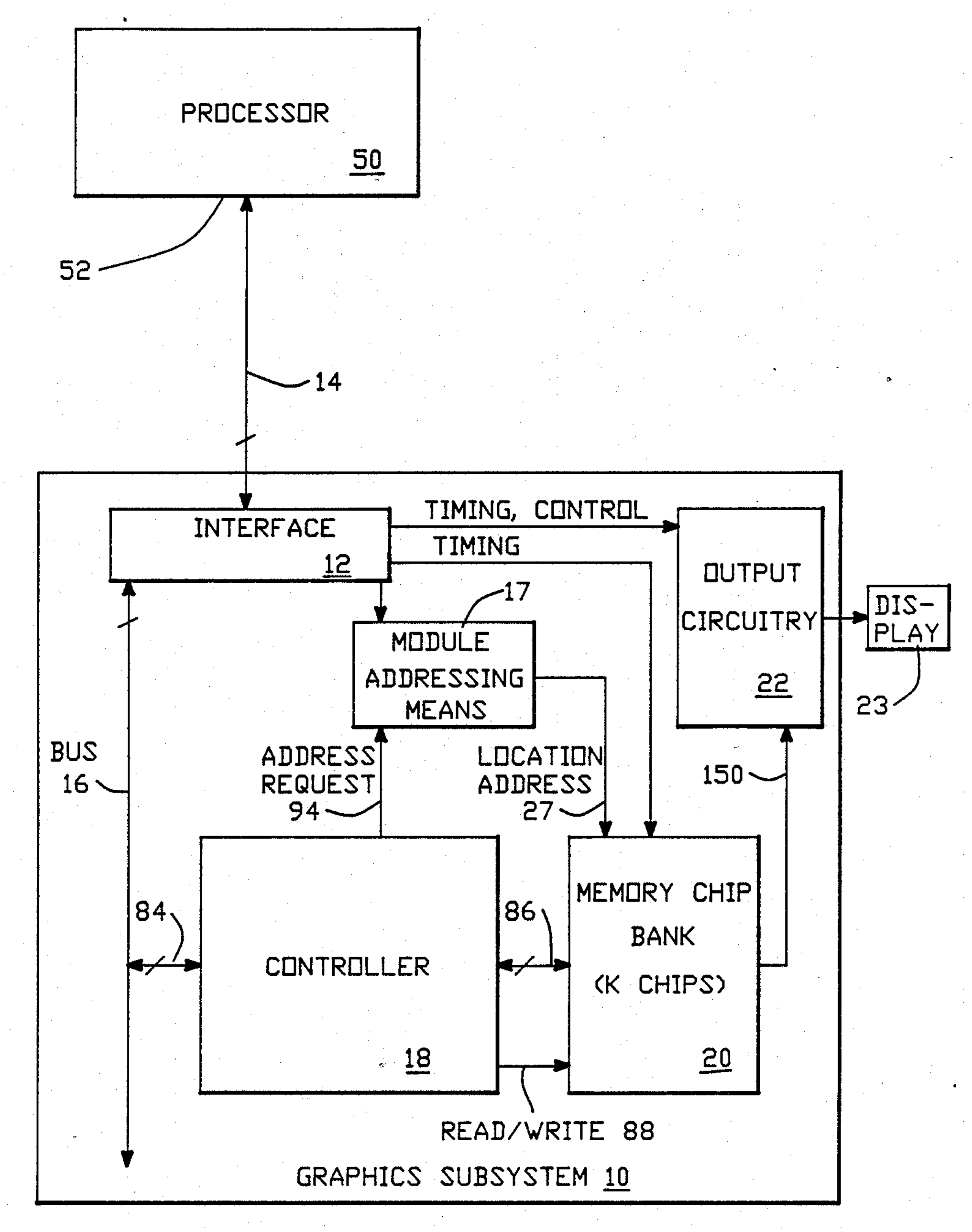
FIG. 1 is a block diagram of a data processing system in which the invention is employed.

Referring now to the drawing, and in particular to FIG. 1, a graphics subsystem 10 (memory module) is connected by processor bus 14 to port 52 of a processor 50. Bus 14 carries signals (specifying data or address) between processor 50 and subsystem 10, and is connected to subsystem 10 through a bus interface 12. A subsystem data bus 16 (module bus) is connected to interface 12. Graphics subsystem 10 provides a memory comprising a bank 20 of K conventional two-port video random access memory chips 24 desirably arranged in a chip array $A \times B = K$. Each chip 24 (memory element) provides an equal plurality of storage locations, each location being addressable relative to the chip origin. The random access ports of the chips of bank 20 are connected through a controller 18 to subsystem bus 16. The serial output ports of the chips of bank 20 are connected by connector 150 to graphics output circuitry 22, which is of conventional design and need not be described; signals output from circuitry 22 are connected to a conventional raster color display monitor 23.

Processor 50 executes a graphics application program, details of which are not pertinent to the present invention, which results in the specification of matter, such as geometric figures, to be displayed. The images to be displayed are specified by processor 50 in a relatively abstract and concise form, which cannot be directly used to control the display monitor. The specification must be converted to a suitable form, which for a raster display monitor is referred to as a framebuffer comprising an ordered array of framebuffer pixels, each corresponding to a display pixel of the display screen. Such conversion is referred to as rendering. In the system of FIG. 1, the rendering operations are carried out by graphics subsystem 10.

Still referring to FIG. 1, interface 12 comprises means for performing the usual functions of a bus interface, such as bus monitoring and support, and bus protocol. For the particular function of interfacing between bus 14 and the graphics subsystem 10, interface 12 additionally provides timing means for controller 18, for output circuitry 22, for memory bank 20, and for the display monitor; means for controlling subsystem bus 16; and certain computational means whose purpose will become clear in what follows.

Memory module addressing means 17, responsive to signals from controller 18, provides location address signals 27 to bank 20. It should be understood that although for clarity of description memory module addressing means is shown in FIG. 1 as separate from interface 12 and controller 18, this arrangement is not significant. The necessary addressing functions may be provided by circuitry otherwise distributed, for example, distributed between interface 12 and controller 18.

Figure 2:
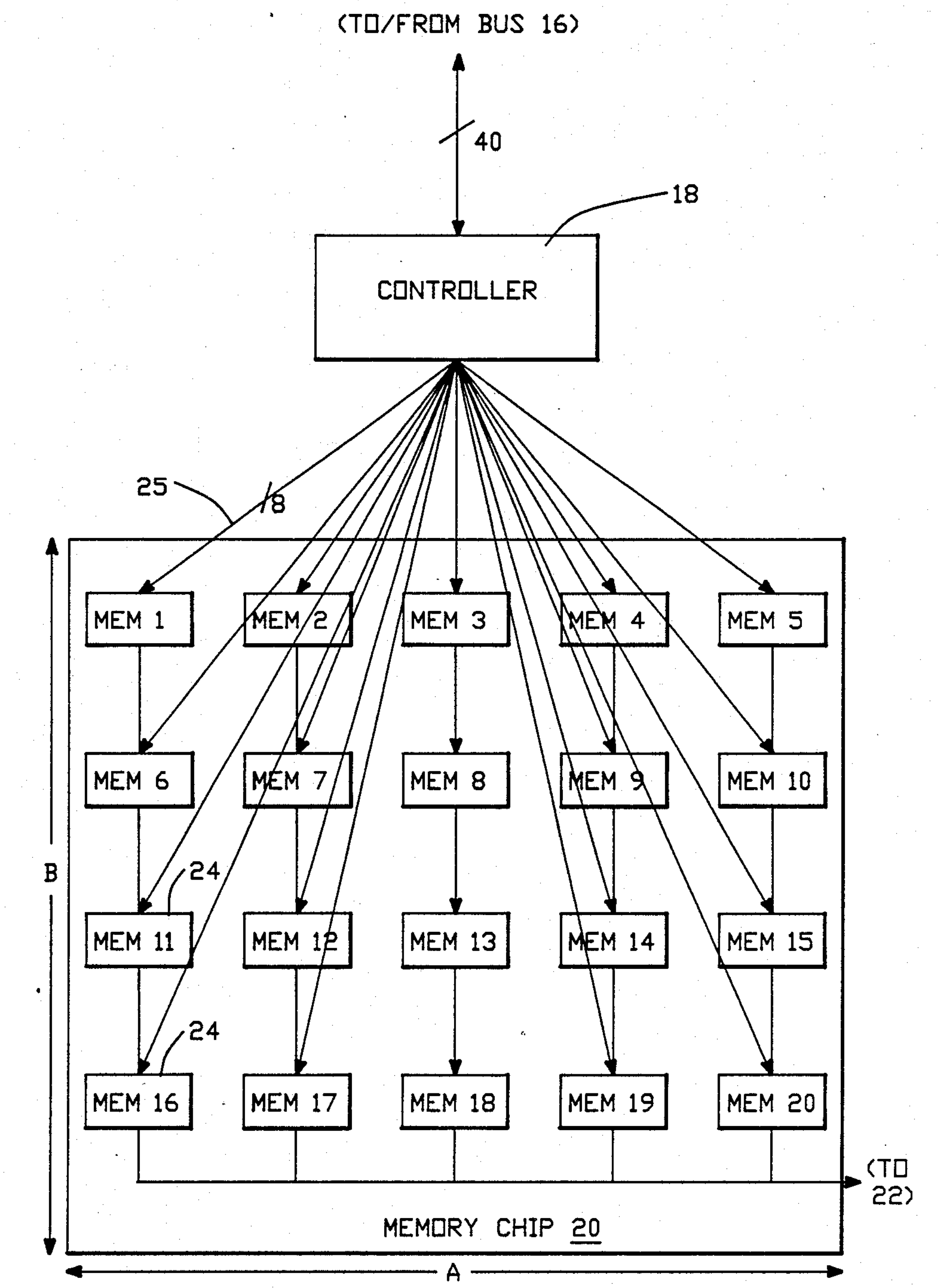
FIG. 2 is a block diagram of the memory chip bank of the data processing system of FIG. 1.

The video RAM chips of bank 20 are disposed as a $A \times B = K$ chip array, for example, referring now to FIG. 2, a (A=5)×(B=4) array of K=20 chips 24, each chip 24 (identified by its chip array position as (a,b)) having an 8-bit parallel i/o path to controller 18. Other chip array dimensions may also be employed, for example, (A=4)×(B=4) with an 8-bit parallel i/o path, or (A=20)×(B=1). Controller 18 has the capability of accessing in parallel (path width)×A×B bits, or for the embodiment of FIG. 2, (8×5×4)=160 bits.

The set of corresponding locations in the K chips (a,b) specified by a location address from module addressing means 17 comprises an addressed location array.

In a system using a raster display, the framebuffer storage (and the corresponding framebuffer, which is conceptual rather than physical) of a graphics subsystem is mapped to the display screen in terms of pixels (picture elements). The raster display screen comprises a rectangular array of X×Y display pixels (x,y). At any particular time, each display pixel displays a color specified by a color value; signals specifying the color value are stored in the framebuffer storage at the (x,y) position of the framebuffer pixel corresponding to the display pixel. The display is refreshed by output circuitry such as circuitry 22 in FIG. 1, which cyclically reads signals from the framebuffer storage, interprets the signals, and controls display monitor 23 appropriately to display corresponding colors in the display pixels, all in a manner well understood in the art. Changes in the display are made by updating the specifications of color values in framebuffer storage; on the next refresh cycle these changes are represented by corresponding changes on the display screen.

Figure 3:
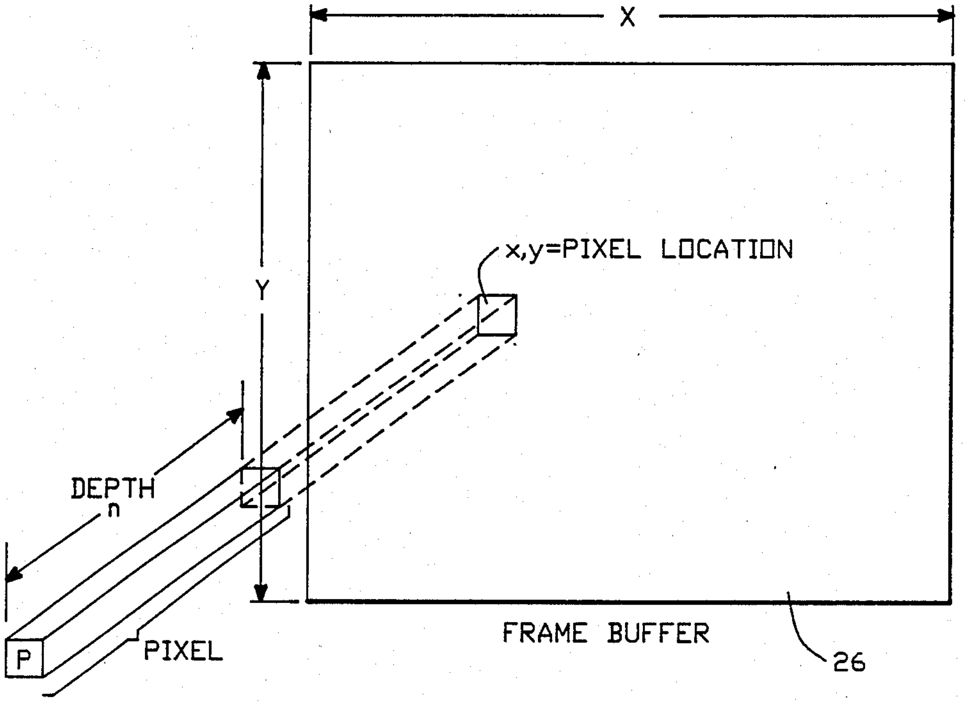
FIG. 3 is a conceptual showing of a framebuffer specified in the memory chip bank of FIG. 2, and a pixel thereof.

Conceptually, the bits comprising a framebuffer pixel x,y (specifying the color value of the display pixel x,y) are regarded as being all stored at the pixel position in the framebuffer, which is regarded as a three dimensional construct. Referring now to the conceptual showing of FIG. 3, a framebuffer 26 comprises an array, X framebuffer pixels across and Y framebuffer pixels vertically, corresponding to the X×Y display pixels of the display; at the specific framebuffer position (x,y) the framebuffer has n bits comprising a framebuffer pixel. The framebuffer pixel is said to have depth n.

Module addressing means 17 and controller 18 control the storage of signals in the A×B video RAM chips 24 of bank 20 in addressed array locations such that signals specifying certain adjacent framebuffer pixels can be accessed in bank 20 in parallel through controller 18 responsive to a single location address relative to chip origin, supplied in parallel to all chips from module addressing means 17. In particular, the framebuffer pixel signals are so stored that an update array of W×H pixels can be accessed in parallel, the update array being so specified that the entire X×Y framebuffer (and display) can be tiled by a plurality of such W×H update arrays having determined origins. Each update array can be identified by an array origin identifier. The dimensions W, H of the update array need not be equal to the dimensions A, B of the chip array, but in the simplest case W=A and H=B.

The connections 150 between the serial output ports of chips 24 and video output circuitry 22 determine the mapping between chips 24 and the display screen; that is, the framebuffer pixels in memory 20, as located by the mapping between controller 18 and chips 24, must be serially accessed in raster order of (x,y) to refresh the display.

Figure 4:
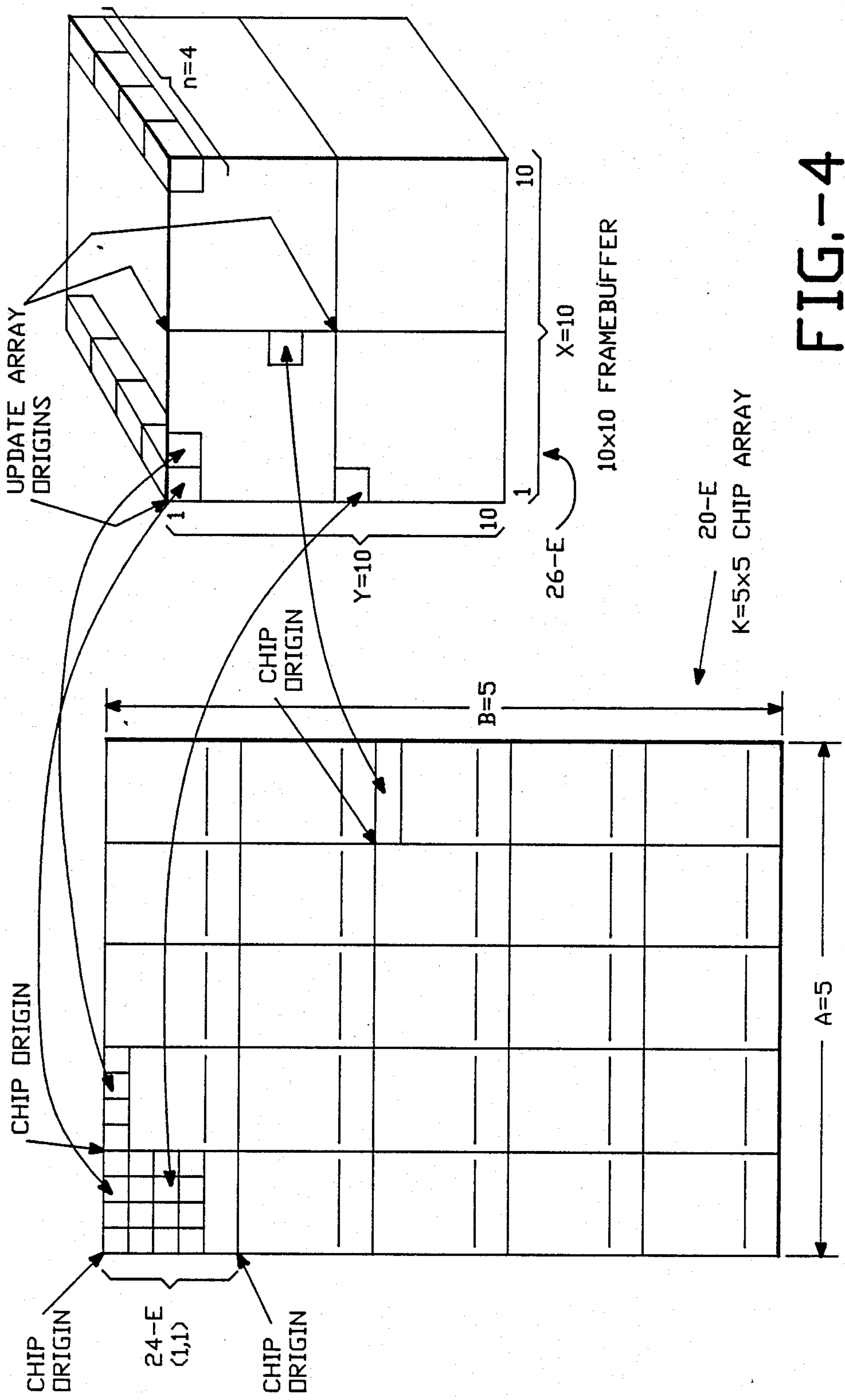
FIG. 4 is an illustrative showing of the mapping between the locations of a memory chip bank and a conceptual framebuffer.

Referring now to FIG. 4, by way of illustration the mapping is shown between a conceptual three-dimensional framebuffer and a corresponding physical chip bank laid out on a plane. (The particular numbers employed are not those of a real graphics subsystem but have been chosen to provide a simple illustrative example.) An exemplary framebuffer 26-E has 100 framebuffer pixels (X=10)×(Y=10) as shown, each pixel having an exemplary depth of n=4 bits. The signals representing the framebuffer are stored physically in chip bank 20-E comprising a (A=5)×(B=5) chip array (K=25 chips), controlled by a controller (not shown) to provide 4 bit parallel access from the controller to each chip (a,b) in chip array 20-E. It is assumed that four 4-bit pixels can be stored in each chip. Thus chip (a=1, b=1) of bank 20-E stores the four bits of pixel (x=1, y=1) in its first location; pixel (x=2, y=1) is stored in the corresponding first location of chip (a=2, b=1). These two pixels are in the first update array, and can be accessed in parallel because they are in different chips in the chip array and are in corresponding locations in the respective chips. However framebuffer pixel (x=1, y=6) is stored in the third location of chip (a=1, b=1) of bank 20-E, so that it cannot be accessed in parallel with pixel (x=1, y=1). It is thus seen that framebuffer 26-E is tiled by four 5×5 update arrays of framebuffer pixels having array origins at (1,1), (6,1, (1,6) and (6,6), and that the signals representing all the framebuffer pixels of an update array, stored in the graphics subsystem memory, will be concurrently accessed in parallel in a single memory transaction, specified by a single location address from addressing means 17. In an actual graphics system of interest, many more than four update arrays are required to tile the display. The framebuffer pixels are stored in a set of contiguous storage locations within chips 24-E.

Figure 5:
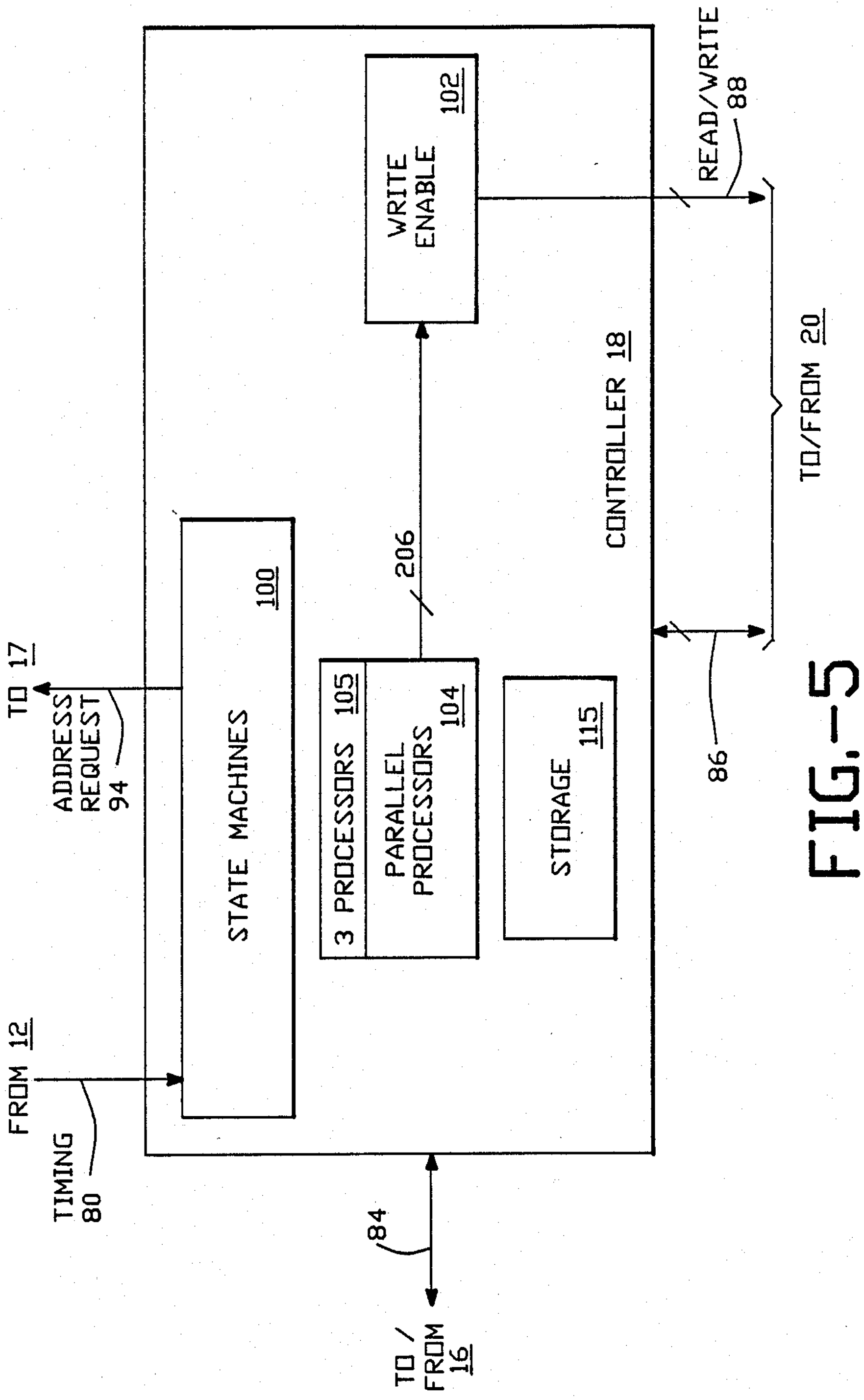
FIG. 5 is a block diagram of a memory controller according to the invention.

Referring to FIG. 5, controller 18 provides state machines 100 for controlling the state of the controller; state machines 100 receive timing signals from interface 12 on lines 80. Controller 18 further provides read/-write enable generating means 102, which outputs to each of chips 24 of bank 20 read/write enable signals on lines 88, in the course of a controller graphics rendering operation. In the embodiment having a (A=5)×(B=4) chip bank 20 with 8-bit parallel paths, data is transmitted on 40-bit parallel path 84 between controller 18 and subsystem bus 16; data is transmitted on 160-bit parallel path 86 between controller 18 and memory bank 20.

For each memory chip of bank 20, controller 18 provides at 104 an internal logical processor for the execution of graphics operations, the processors of 104 operating in parallel (concurrently). Such graphics operations include, for example, writing a geometrical figure to the framebuffer, moving a figure from one part of the framebuffer to another part (which requires both portions of the framebuffer to be redrawn), drawing a line, and the like. In addition, three further logical processors 105 are provided, which operate in parallel with processors 104, as will be described.

The framebuffer is tiled by a number of update arrays having determined origins. A figure to be written to the framebuffer storage in general is mapped to only a subset of the update arrays.

The operation of writing a line of geometric figure to the framebuffer comprises two basic steps. First, it is necessary to determine which update arrays should be addressed to tile the figure, and to address each such array in turn; second, it is necessary to determine which pixel specifications within an addressed update array must be written and to write such pixel specifications. Means and methods for carrying out each of these steps will now be described.

Figure 6:
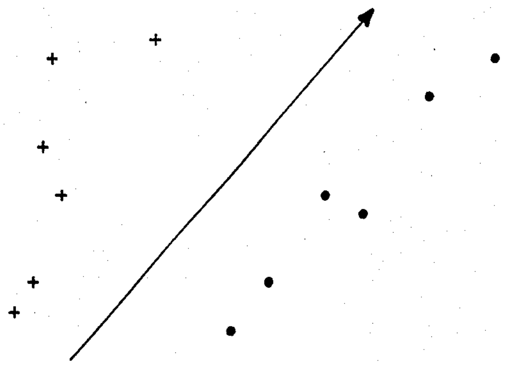
FIG. 6 illustrates a concept employed in the addressing means and method of the invention.

The basis of the described operations is the use of a half-space representation. As seen in FIG. 6, a directed line divides a plane into left and right half-spaces. A half-space evaluation decides on which side of a directed line any point (in a plane) lies. In FIG. 6 all points shown as "+" are in the left half-space, all points shown as "−" are in the right half-space, with respect to the directed line. The line has infinite length.

For a given point, evaluation of its sidedness with respect to a given line is based on the general equation of a line, $$y=mx+b \qquad (1)$$

where m is the slope of the line and b is the y-intercept. Equation (1) is true for values of x and y on the line; $y>mx+b$ for points on one side of the line; and $y<mx+b$ for points on the other side of the line. For a line passing through two specified points ($x_1$, $y_1$) and ($x_2$, $y_2$), the constants for the line equation are $m=dy/dx$, and $b=(y_1-(dy/dx)x_1)$, where $dy=y_2-y_1$, and $dx=x_2-x_1$. Therefore, to evaluate a half space defined by two points specifying the line, equation (2) must be evaluated:

$$y=(dy/dx)x+y_1-(dy/dx)x_1. \qquad (2)$$

The order in which the points ($x_1$, $y_1$) and ($x_2$, $y_2$) are given specifies the direction of the line.

Equation (2) is represented in the real number system. In the present operation, the equation must be evaluated for the discrete locations of the framebuffer pixels, to decide whether each array pixel is inside or outside a figure to be drawn, the figure being composed of a plurality of directed lines. From equation (2) is derived equation (3):

$$dx.y-dy.x-dx.y_1+dy.x_1=0, \quad (3)$$

a form which advantageously avoids divide operations.

The left side of equation (3) is 0 for (x,y) on the line, positive for (x,y) on one side of the line, and negative for (x,y) on the other side of the line. For the purpose of providing circuitry (processors 104, 105) comprising relatively few components but capable of performing the evaluation rapidly, equation (3) is further modified by representing the locations of the pixels within the update array in terms of array origin ($origin_x$, $origin_y$) and pixel offset (site offset) within the array ($offset_x$, $offset_y$; $x=origin_x+offset_x$, $y=origin_y+offset_y$), to arrive at equation (4):

$$dx \times offset_y - dy \cdot offset_x = \quad (4a)$$

$$-dx \cdot origin_y + dy \cdot origin_x + \quad (4b)$$

$$dx \cdot y_1 - dy \cdot x_1. \quad (4c)$$

The form of equation (4) is advantageous because it minimizes computation and therefore minimizes both circuitry and computation time. Most of its terms can be calculated either once per half-space evaluation (that is, once for each directed line of a geometric figure to be written to the framebuffer) or once per array access. Of the terms in equation (4), dx, dy, $x_1$ and $y_1$ are constant for any particular half space, and therefore (4c) need only be evaluated once per half space. The value of this expression is unaffected by pixel position within the update array, or by change to another update array. The expression (4b) must be calculated once for each update array access.

Expression (4a) must be evaluated for all sites of the array. However, the expressions $offset_x$ and $offset_y$ are positive integers specifying the site position within the array; as this is determined by hardware design, these values are built in to controller 18. The value of (4a) can then be easily found in terms of dx and dy; the result (the "site value") is calculated by controller 18 for each half-space (ie for each directed line) and stored for each array site. The site values do not depend upon the particular accessed array, but are constant for the particular lines comprising the figure being drawn. The values of dx, dy are provided by interface 12.

The sum of (4b) and (4c) is called the "half space constant." A new half space constant must be specified for each accessed update array because the value depends on the origin of the array ($origin_x$, $origin_y$). The same value of the half space constant is specified to every logical processor of 104. The sign of the sum of the stored site value and the half-space constant functions as a discriminant which gives the sidedness of the pixel with respect to the line; since the sign bit is the only bit of interest, a comparator can be used instead of an adder. Therefore, referring to FIG. 11, each logical processor of 104 comprises a register 204 to store the site value, input at the commencement of a tiling operation; a magnitude comparator 200, to which the site value from register 204 is a first input; and a second input 202, on which the half-space constant for the array is input to comparator 200. The discriminant signal is output on line 206.

Figure 7:
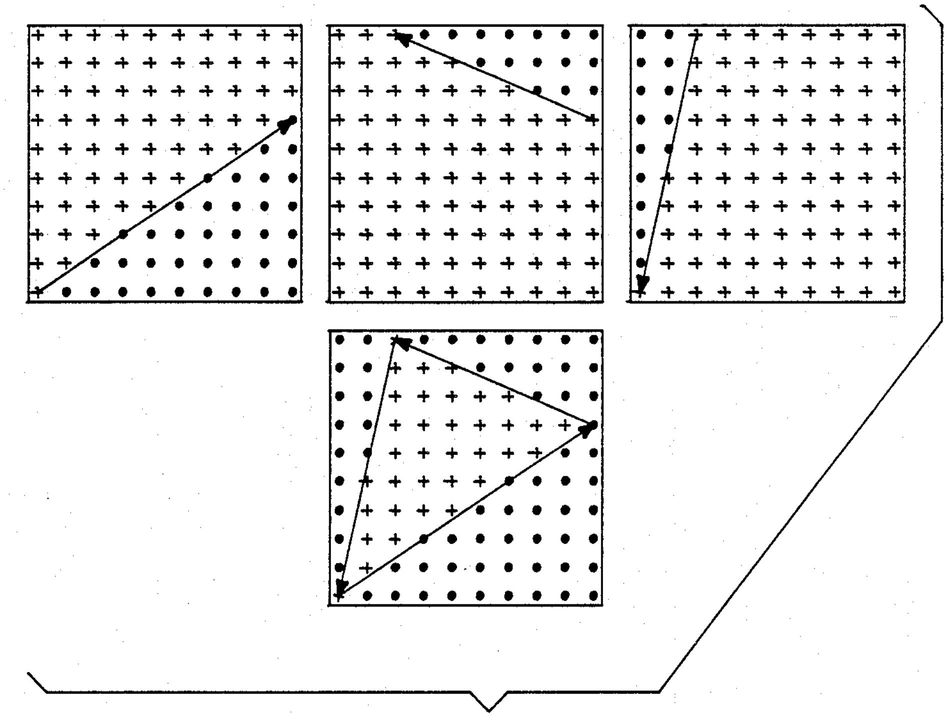
FIG. 7 shows a geometric figure represented in terms of the concept illustrated in FIG. 6.

The half-space evaluation must be made for each line bounding the figure to be drawn to the framebuffer. Referring next to FIG. 7, it is seen that the interior area of a triangle, for example, can be represented as the intersection of three half spaces with respect to the sides, represented as directed lines. The segments of the lines between their mutual intersections comprise a closed boundary of a convex geometric figure. The directions of the lines must be such that the segments perambulate the boundary in a single sense; that is, the line segments must all be "nose to tail". Ascertaining whether a pixel is inside the triangle is accomplished by concurrently evaluating its sidedness with respect to three directed lines. Thus, for each pixel, a processor of the kind shown in FIG. 11 must be provided at 104 for each half-space evaluation to be made.

A logical AND of the discriminants for all the bounding lines gives the final result discriminant; that is, the pixel must be inside with respect to all the directed lines to be inside the triangle. (Pixels on a line are assigned to one or the other half space, based on considerations not pertinent to this invention.)

The output of the AND is used to condition the write enable 88 to the memory chip 24 on which the specification of the pixel is stored. A first value of the result discriminant specifies insidedness of the pixel; the second value specifies outsidedness. A write enable to the pixel site cannot be provided in the presence of a result discriminant of the second value. Other conditions may be imposed on the write enable, for example, as a result of windowing, clipping and other operations. The method can be generalized to n-sided convex polygons; more complex figures can be represented as composed of convex polygons. Line segments on a raster display can be modeled as the intersection of four half-spaces.

Data signals specifying the geometric figure to be drawn (as by giving the (x,y) positions of the vertices on the display) are transmitted by processor 50 to interface 12, which transmits the necessary data to controller 18. Such specification must include, whether explicitly or implicitly in terms of the order of specifying the line segment end points, direction of each the line segments, such that a closed figure is specified by the line segments between mutual intersections and the figure boundary is perambulated by the segments in a single sense. The rendering operation can begin with any arbitrary location in the figure to be drawn; for example, a first vertex can be selected and the update array to which it is mapped first accessed. Alternatively, a preliminary evaluation can be made to find the left-most (or right-most) point in the figure to be drawn, after which the update array to which that point is mapped is first accessed. This latter method offers certain economies of operation.

As controlled by state machines 100, controller 18 begins operation by accessing the initial update array. Controller 18 outputs an appropriate address request at 94 to interface 17, which provides corresponding location address signals to memory bank 20. By concurrently performing half space evaluations for the pixels of the first update array with respect to the corresponding portion of the figure to be drawn, processors 104 of controller 18 control write enable means 102 to output signals on 88 so as to permit the writing of the corresponding pixels to which the figure is mapped.

Figure 8:
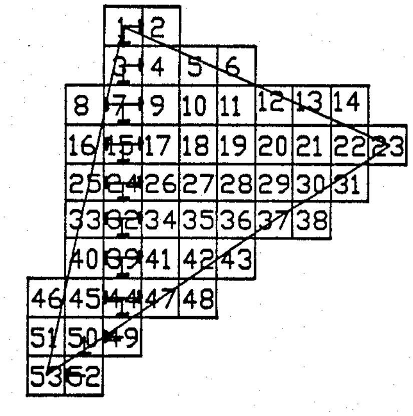
FIG. 8 shows a geometric figure tiled by a plurality of sequentially addressed framebuffer pixel arrays.

A next update array must then be addressed, accessed and written, and so on until the geometric figure has been tiled. A tiling operation is illustrated in FIG. 8 in which a triangle is shown tiled by 53 update arrays. The numbers in each box indicate the order in which the update arrays are accessed. Array 1 is first accessed. In the method illustrated in FIG. 8, the initially accessed array is the one with the first vertex. In the alternative method, array 53 would be first accessed, as having the left-most element of the figure mapped to it.

Controller 18 stores the address of the initially accessed update array in storage 115. The pixels of the initial array are written as described. A test (to be described) is performed to decide whether the figure continues to the array below the initially accessed array; if it does, the stored array address is so marked (for example, by a flag). Similarly, the test is performed to decide whether the figure continues to the array above the initial array; if so, the stored array address is so marked. If the figure to be drawn was not initially evaluated to find the left-most point in it, the test is performed to decide whether the figure continues to the array to the left of the initial array. If it does, controller 18 outputs address request signal 94, specifying the next array; in response, addressing means 17 outputs location address signal 27 to memory bank 20, addressing the specified next update array. The pixels of this next array are written as a result of half-space evaluation operations as previously described. The tests (down, up and left) are performed again. However, if the address of any array in this row has previously been stored and flagged for down continuation of the figure, the address of this array will not be so flagged; similarly for up continuation. The operation is repeated until the result of the test indicates that the figure is not mapped to the next left array. For example, in FIG. 8, after writing array 1, it is found from the test that the array to the left of it is not mapped to the figure.

Controller 18 then (using the specification of the initial array stored at 115) performs the tests with respect to the array next on the right of the initial array. Again, if the figure is mapped to this array, it is accessed and the pixels are written by means of parallel half-space evaluation operations as previously described. As the specification of the starting point has been saved, no array is accessed or written twice.

At the end of the operation with respect to a horizontal row of arrays, every array in that row to which the figure is mapped has been accessed and written, and at most one array address has been flagged for up continuation and one for down continuation.

When no further arrays in the row are found to be mapped to the figure, controller 18 operates with respect to the flagged array addresses, to access a downwardly adjacent array. This becomes the initial array of the next horizontal procedure. When no further arrays downwardly are found to be mapped to the figure, the process pops to the first stored array which has been flagged for upward continuation of the figure. When no further upward flags are found, the process has been completed. It will be understood that the upward flags could be first exhausted before moving to the downward flags; the requirement is simply that all arrays to which the figure is mapped should be accessed and written, without repeating any operation.

Figure 11:
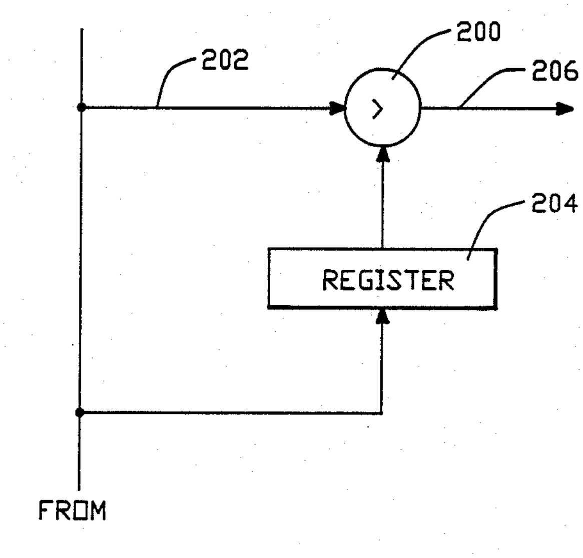
FIG. 11 is a block diagram of an element of FIG. 5.
Figure 9:
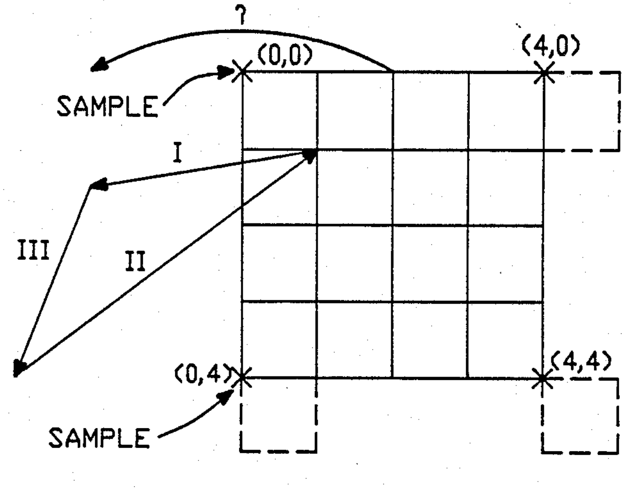
FIG. 9 shows a geometric figure mapped to a particular framebuffer pixel array for generating an address for a next array.

To test whether a figure is mapped to an adjacent array, referring now to FIG. 9, a border set of pixels is defined as the row or column of pixels in the previously addressed 4×4 array lying closest to the array in question. (The dimensions 4×4 are exemplary only.) The pertinent half-space evaluations are performed by sampling each of the two pixels which bound the border set. However, as will be noted in FIG. 9, one (0,0) of the sampled pixels (considered to be located at its origin corner) is within the currently accessed update array, while the other (0,4) is outside it. The (0,0) pixel evaluation is performed by the corresponding logical processor of 104 in the course of writing the figure to the update array; the additional three logical processors 105 are provided to perform the parallel evaluation of the three pixel locations (4,0), (0,4) and (4,4) which are all outside the currently accessed array. As these locations cannot be accessed concurrently with the locations of the currently accessed array, the three additional processors 105 do not control the write enable means. The processors 105 are otherwise similar to those of 104, as shown in FIG. 11. The outputs of these processors 105 are used only for the purpose of tiling the figure by selecting further update arrays for access.

A triangle composed of three line segments I, II and III is shown mapped to a first array. The test is performed with respect to the decision whether to address the next array to the left. Each of the pixels (0,0) and (0,4) is evaluated with respect to each of the three line segments.

The criterion for left access is that every half-space defined by the figure has one of the sample pixels of the left border set inside. The inside sample pixel need not be the same for any of the half-spaces; but no one of the line segments can exclude both pixels. For line segment I, the sample pixel (0,4) is found to be in the inside half-space; for line segment II, the sample pixel (0,0) is found to be in the inside half-space; for line segment III, both sample pixels are found to be in the inside half-space. Since for each half-space at least one sample pixel is inside, the figure is considered to be mapped to the next left update array. Controller 18 therefore issues an address request signal 94 specifying such array to addressing means 17, which provides the corresponding location address signal to memory bank 20.

Figure 10:
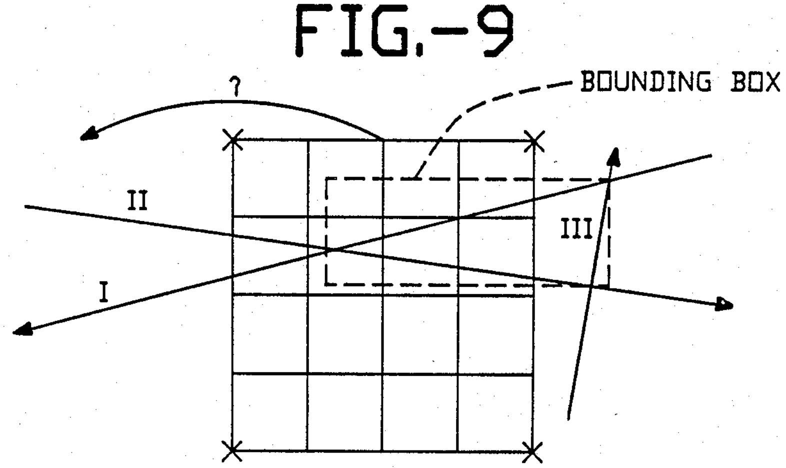
FIG. 10 shows a geometric figure mapped to a particular pixel array with an additional addressing condition imposed.

A final constraint is imposed. As shown in FIG. 10, a triangle composed of directed line segments I, II and III terminates at a vertex mapped to pixel (1,1) of the array. However, upon applying the test described above for deciding whether to address the array lying horizontally to the left of the illustrated array, it is found that the test is met, although in fact the figure ought not to be drawn into the next array. To prevent erroneous addressing, a specification of a "bounding box" which encloses the figure being drawn (derived from the vertex information initially transmitted from processor 50) is stored in 115. Before requesting addressing of the next array, controller 18 compares the (x,y) position of the array with the bounding box position. When the result shows that the next array lies outside the bounding box, the test result is overridden.

The described operation of selecting a next update array is particularly advantageous in that the half-space evaluation for one of the sample pixels is made in the operation of writing selected pixels within the accessed framebuffer update array, while the other is easily made concurrently with such writing operation. This permits the test to be made quickly and simply.

In addition, the described operations are equally useful in the drawing of both lines and polygons to the framebuffer. This provides economy of design of the controller, as circuitry need only be provided for a single mode of operation. In contrast, incremental operations used in the prior art for drawing lines generally are quite different from incremental operations for drawing polygons, necessitating the provision of additional circuitry in such incremental rendering systems.

What is claimed is:

1. In a graphics subsystem having framebuffer storage organized for storing signals specifying pixels (x,y) of an X×Y raster framebuffer, said storage being sequentially addressable as a plurality of framebuffer pixel update arrays which tile the framebuffer, including a plurality of horizontal rows of update arrays forming an array of said update arrays, each said update array having a determined origin with respect to said framebuffer and comprising storage sites for specifications of a plurality of contiguously positioned framebuffer pixels, each said storage site being specifiable by an offset with respect to said update array origin, pixel specifications for all the storage sites of a said update array being concurrently updatable in a parallel memory transaction, a method of accessing from among said update arrays a horizontal subset to which is mapped a geometric figure to be drawn to said framebuffer, comprising the steps:

(1-1) accessing a first said update array, and storing a specification of said array address denoting it as the first accessed update array, (1-2) testing whether said geometric figure is mapped to an update array positioned vertically above said accessed array with respect to the framebuffer, and if so, and if no previous array in the present horizontal row has been marked for upward continuation of said figure, storing a specification of said array address if not previously stored, and marking said stored array address specification for upward continuation of said figure, (1-3) testing whether said geometric figure is mapped to the update array positioned vertically below said accessed array with respect to the framebuffer, and if so, and if no previous array in the present horizontal row has been marked for downward continuation of said figure, storing a specification of said array address if not previously stored, and marking said stored array address specification for downward continuation of said figure, (1-4) testing whether the geometric figure is mapped to an update array positioned horizontally next to the left of said accessed array with respect to the framebuffer, and if so, accessing said next left array, (1-5) repeating steps (1-2)–(1-4) with respect to the array accessed in step (1-4) until the geometric figure is found not to be mapped to the next left array, (1-6) reading said stored array address denoted in step (1-1) as the first accessed update array and denoting the update array corresponding to said stored array address as the last accessed update array, (1-7) testing whether said geometric figure is mapped to an update array positioned horizontally next to the right of the last accessed update array with respect to the framebuffer, and if so, accessing said next right array, and (1-8) repeating steps (1-2), (1-3) and (1-7) until said geometric figure is found not to be mapped to the next right array.

2. In a graphics subsystem having framebuffer storage organized for storing signals specifying the pixels (x,y) of an X×Y raster framebuffer, said storage being sequentially addressable as a plurality of framebuffer pixel update arrays which tile the framebuffer, including a plurality of horizontal rows of update arrays forming an array of said update arrays, each said update array having a determined origin with respect to said framebuffer and comprising storage sites for specifications of a plurality of contiguously positioned framebuffer pixels, each said storage site being specifiable by an offset with respect to said update array origin, pixel specifications for all the storage sites of a said update array being concurrently updatable in a parallel memory transaction, a method of accessing from among said update arrays a subset which tiles a geometric figure to be drawn to said framebuffer, comprising the steps:

(2-1) performing the steps of claim 1 until, in a first horizontal row of said update arrays, all update arrays to which said geometric figure is mapped have been accessed, (2-2) reading said stored array address marked for upward continuation of said figure, accessing the update array vertically above the update array corresponding to said stored array address, storing a specification of the address of said array denoting it as the first accessed update array, and repeating steps (1-2)–(18) of claim 1 with respect to the current accessed array until a next horizontal subset of arrays to which the geometric figure is mapped has been accessed, (2-3) repeating step (2-2) for further horizontal subsets until there are no further stored addresses marked for upward continuation of said figure, (2-4) reading said stored array address marked for downward continuation of said figure, accessing the update array vertically below the update array corresponding to said stored array address, storing a specification of the address of said array denoting it as the first accessed update array, and repeating steps (1-2)–(1-8) of claim 1 with respect to the current accessed array until a next horizontal subset of arrays to which the geometric figure is mapped has been accessed, and (2-5) repeating step (2-4) for further horizontal subsets until there are no further addresses marked for downward continuation of said figure.

3. The method of claim 2, further comprising the steps:

(8-1) deriving and storing a specification with respect to said framebuffer of a box bounding said geometric figure to be drawn;

(8-2) before accessing each update array after said initial array, comparing the position of said update array with respect to the framebuffer with said stored specification of said bounding box; and (8-3) accessing said update array only if said array is mapped to the area of said bounding box.

4. The method of claim 1, wherein the update array to which a first vertex of said geometric figure is mapped is accessed in step (1-1).

5. In a graphics subsystem having framebuffer storage organized for storing signals specifying the pixels (x,y) of an X×Y raster framebuffer, said storage being sequentially addressable as a plurality of framebuffer pixel update arrays, the set of said update arrays tiling the framebuffer, each said update array having a determined origin with respect to said framebuffer and comprising storage sites for specifications of a plurality of contiguously positioned framebuffer pixels, each said storage site being specifiable by an offset with respect to said update array origin, pixel specifications for all the storage sites of a said update array being concurrently updatable in a parallel memory transaction, a method of accessing from among said update arrays a subset which tiles a geometric figure to be drawn to said framebuffer, comprising the steps:

(7-1) performing the steps of claim 1 until in a first horizontal subset of arrays, all arrays to which the geometric figure is mapped have been accessed, (7-2) reading said stored array address marked for downward continuation of said figure of the first horizontal subset, accessing the update array vertically below the update array specified by said read array address, storing a specification of the address of said accessed array denoting it as the first update array accessed, and repeating steps (1-2)–(1-8) of claim 1 with respect to the current accessed array until a next horizontal subset of arrays to which the geometric figure is mapped has been accessed, (7-3) repeating step (7-2) for further horizontal subsets until there are no further addresses marked for downward continuation of said figure, (7-4) reading said stored array address marked for upward continuation of said figure, accessing the update array vertically above the update array specified by said read array address, storing a specification of the address of said array denoting it as the first update array accessed, and repeating steps (1-2)–(1-8) of claim 1 with respect to the current accessed array until a next horizontal subset of arrays to which the geometric figure is mapped has been accessed, and (7-5) repeating step (7-2) for further horizontal subsets until there are no further stored addresses marked for upward continuation of said figure.

6. In a graphics subsystem having framebuffer storage organized for storing signals specifying the pixels (x,y) of an X×Y raster framebuffer, said storage being sequentially addressable as a plurality of framebuffer pixel update arrays which tile the framebuffer, including a plurality of horizontal rows of update arrays forming an array of said update arrays, each said update array having a determined origin with respect to said framebuffer and comprising storage sites for specifications of a plurality of contiguously positioned framebuffer pixels, each said storage site being specifiable by an offset with respect to said update array origin, pixel specifications for all the storage sites of a said update array being concurrently updatable in a parallel memory transaction, a method of accessing from among said update arrays a subset which tiles a geometric figure to be drawn to said framebuffer, comprising the steps:

(4-1) accessing an update array to which a first vertex of said geometric figure is mapped, and storing a specification of said array address denoting it as the first accessed update array, (4-2) performing the steps of claim 1 until, in a first horizontal subset of said update arrays, all update arrays to which the geometric figure is mapped have been accessed, (4-3) reading said stored array address marked for upward continuation of said figure, accessing the update array vertically above the update array specified by said read array address, storing a specification of the address of said array denoting it as the first accessed update array, and repeating steps (1-2)–(1-8) of claim 1 with respect to the current accessed array until a next horizontal subset of arrays to which the geometric figure is mapped has been accessed, (4-4) repeating step (4-3) for further horizontal subsets until no further stored addresses marked for up are found, (4-5) reading said stored array address marked for downward continuation of said figure, accessing the update array vertically below the update array specified by said read array address, storing a specification of the address of said array denoting it as the first accessed update array, and repeating steps (1-2)–(1-8) of claim 1 with respect to the current accessed array until a next horizontal subset of arrays to which the geometric figure is mapped has been accessed, and (4-6) repeating step (4-5) for further horizontal subsets until there are no further addresses marked for downward continuation of said figure.

7. In a graphics subsystem having framebuffer storage organized for storing signals specifying the pixels (x,y) of an X×Y raster framebuffer, said storage being sequentially addressable as a plurality of framebuffer pixel update arrays which tile the framebuffer, including a plurality of horizontal rows of update arrays forming an array of said update arrays, each said update array having a determined origin with respect to said framebuffer and comprising storage sites for specifications of a plurality of contiguously positioned framebuffer pixels, each said storage site being specifiable by an offset with respect to said update array origin, pixel specifications for all the storage sites of a said update array being concurrently updatable in a parallel memory transaction, a method of accessing from among said update arrays a horizontal subset to which is mapped a geometric figure to be drawn to said framebuffer, comprising the steps:

(5-1) finding the left-most element of said geometric figure with respect to said framebuffer, (5-2) accessing an update array to which said left-most element is mapped, (5-3) testing whether said geometric figure is mapped to an update array positioned vertically above said accessed array with respect to the framebuffer, and if so, and if no previous array in the present horizontal row has been marked for up, storing a specification of said array address if not previously stored, and marking said stored array address specification for upward continuation of said figure, (5-4) testing whether said geometric figure is mapped to an update array positioned vertically below said accessed array with respect to the framebuffer, and if so, and if no previous array in the present horizontal row has been marked for downward continuation of said figure, storing a specification of said array address if not previously stored, and marking said stored array address specification for downward continuation of said figure, (5-5) testing whether said geometric figure is mapped to the update array positioned horizontally next to the right of said accessed array with respect to the framebuffer, and if so, accessing said next right array, and (5-6) repeating steps (5-3)–(5-5) with respect to the array accessed in step (5-5) until the geometric figure is found not to be mapped to the next right array.

8. In a graphics subsystem having framebuffer storage organized for storing signals specifying the pixels (x,y) of an X×Y raster framebuffer, said storage being sequentially addressable as a plurality of framebuffer pixel update arrays which tile the framebuffer, including a plurality of horizontal rows of update arrays forming an array of said update arrays, each said update array having a determined origin with respect to said framebuffer and comprising storage sites for specifications of a plurality of contiguously positioned framebuffer pixels, each said storage site being specifiable by an offset with respect to said update array origin, pixel specifications for all the storage sites of a said update array being concurrently updatable in a parallel memory transaction, a method of accessing from among said update arrays a subset which tiles a geometric figure to be drawn to said framebuffer, comprising the steps:

(6-1) performing the steps of claim 5 until in a first horizontal subset of arrays, all arrays to which the geometric figure is mapped have been accessed, (6-2) reading said stored array address marked for upward continuation of said figure, accessing the update array vertically above the specified array, storing a specification of the address of said array marked as initial, and repeating steps (5-2)–(5-7) of claim 5 with respect to the current accessed array until a next horizontal subset of arrays to which the geometric figure is mapped has been accessed, (6-3) repeating step (6-2) for further horizontal subsets until there are no further stored addresses marked for upward continuation of said figure, (6-4) popping to the stored array address marked for downward continuation of said figure of the first horizontal subset, accessing the update array vertically below the specified array, storing a specification of the address of said array marked as initial, and repeating steps (5-2)–(5-7) of claim 5 with respect to the current accessed array until a next horizontal subset of arrays to which the geometric figure is mapped has been accessed, and (6-5) repeating step (6-3) for further horizontal subsets until there are no further addresses marked for downward continuation of said figure.

9. In a graphics subsystem having framebuffer storage organized for storing signals specifying the pixels (x,y) of an X×Y raster framebuffer, said storage being sequentially addressable as a plurality of framebuffer pixel update arrays which tile the framebuffer, including a plurality of horizontal rows of update arrays forming an array of said update arrays, each said update array having a determined origin with respect to said framebuffer and comprising storage sites for specifications of a plurality of contiguously positioned framebuffer pixels, each said storage site being specifiable by an offset with respect to said update array origin, pixel specifications for all the storage sites of a said update array being concurrently updatable in a parallel memory transaction, a method of testing whether a geometric figure to be drawn to the framebuffer, mapped to a first said update array, is mapped to a neighboring update array adjacent to said first array with respect to the framebuffer, comprising:

specifying said geometric figure by specifying with respect to said framebuffer a set of directed lines such that the segments of said lines between their mutual intersections comprise the boundary of said figure, specifying for said first update array with respect to said adjacent array, a pair of sample framebuffer pixels, comprising a corner pixel of said first update array which is adjacent said neighboring update array, and a second sample pixel which is adjacent said neighboring update array and adjacent said first update array, evaluating, for each specified directed line, the sidedness of said sample pixels with respect to said directed line, and when at least one of said sample pixels is inside with respect to each said directed line, accessing said adjacent update array.

* * * * *

UNITED STATES PATENT AND TRADEMARK OFFICE

CERTIFICATE OF CORRECTION

PATENT NO. : 4,935,880 
DATED : June 19, 1990
INVENTOR(S) : Brian Kelleher et al.

It is certified that error appears in the above-identified patent and that said Letters Patent is hereby corrected as shown below:

Column 12,
Line 38, delete "(18)" and insert therefor -- (1 - 8) --

Signed and Sealed this

Twenty-first Day of June, 2005

JON W. DUDAS
*Director of the United States Patent and Trademark Office*